United States Patent [19]
Perisic

[11] Patent Number: 4,678,298
[45] Date of Patent: Jul. 7, 1987

[54] METHOD AND APPARATUS FOR THREE-DIMENSIONAL PHOTOGRAPHY

[76] Inventor: Zoran Perisic, Gwynfenton, White Well, St. Teath, Nr. Bodmin, Cornwall, United Kingdom

[21] Appl. No.: 822,872

[22] Filed: Jan. 27, 1986

Related U.S. Application Data

[63] Continuation-in-part of Ser. No. 553,709, Nov. 21, 1983, abandoned.

[30] Foreign Application Priority Data

Nov. 22, 1982 [GB] United Kingdom ............... 8233258
Feb. 21, 1983 [GB] United Kingdom ............... 8304715

[51] Int. Cl.$^4$ ............................................. G03B 35/02
[52] U.S. Cl. ......................................... 352/62; 352/57
[58] Field of Search ................... 352/60, 62, 65, 57

[56] References Cited

U.S. PATENT DOCUMENTS

| | | | |
|---|---|---|---|
| 1,585,129 | 5/1926 | Smith | 352/65 |
| 1,964,968 | 7/1934 | Warmisham | 352/65 |
| 3,433,561 | 3/1969 | Jacobsen | 352/60 |

FOREIGN PATENT DOCUMENTS

| | | | |
|---|---|---|---|
| 322825 | 2/1903 | France | 352/65 |
| 1113788 | 4/1956 | France | 352/65 |
| 420843 | 3/1967 | Switzerland | 352/62 |
| 555408 | 8/1943 | United Kingdom | 352/65 |
| 575911 | 3/1946 | United Kingdom | 352/65 |

Primary Examiner—Monroe H. Hayes
Attorney, Agent, or Firm—Brown, Martin, Haller & Meador

[57] ABSTRACT

An apparatus for three-dimensional photography provides left and right eye images alternately along the lens axis of a camera for recording alternately on a film strip. The left and right eye images are received along spaced first and second axes separated by a distance substantially consistent with the interocular distance of natural eyes, and are resolved alternately along the lens axis of the camera. Lens assemblies are provided for each eye image to provide a horizontal spread of between 40° and 60° which substantially matches the natural horizontal field of vision. The convergence of the first and second axes is adjustable. The camera may be provided with a viewfinder in which the left and right eye images are separated out again.

8 Claims, 6 Drawing Figures

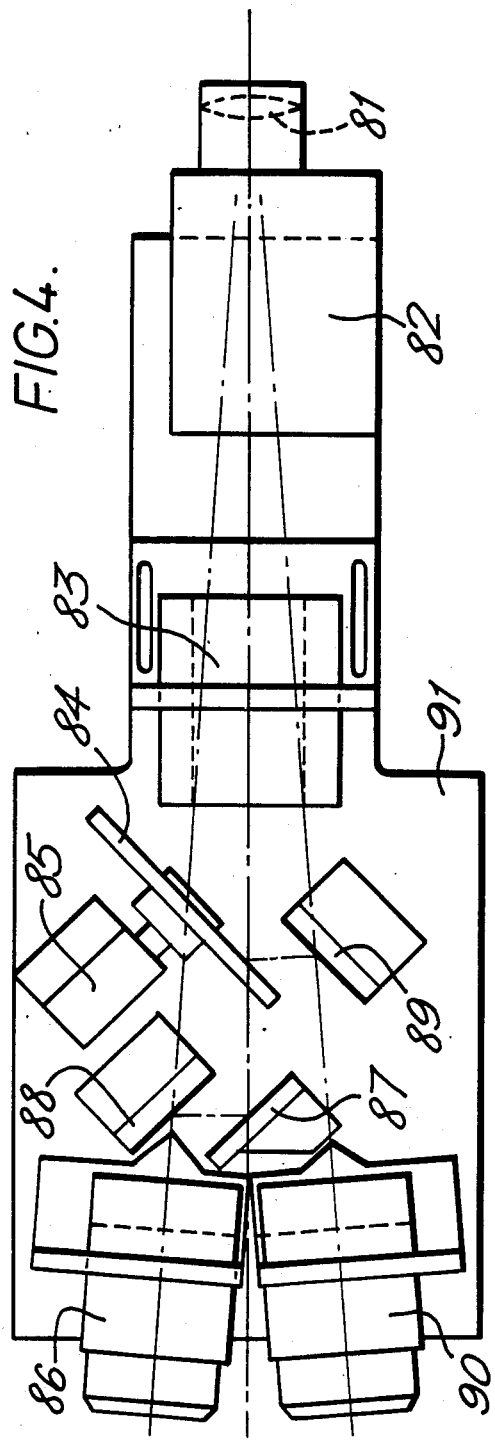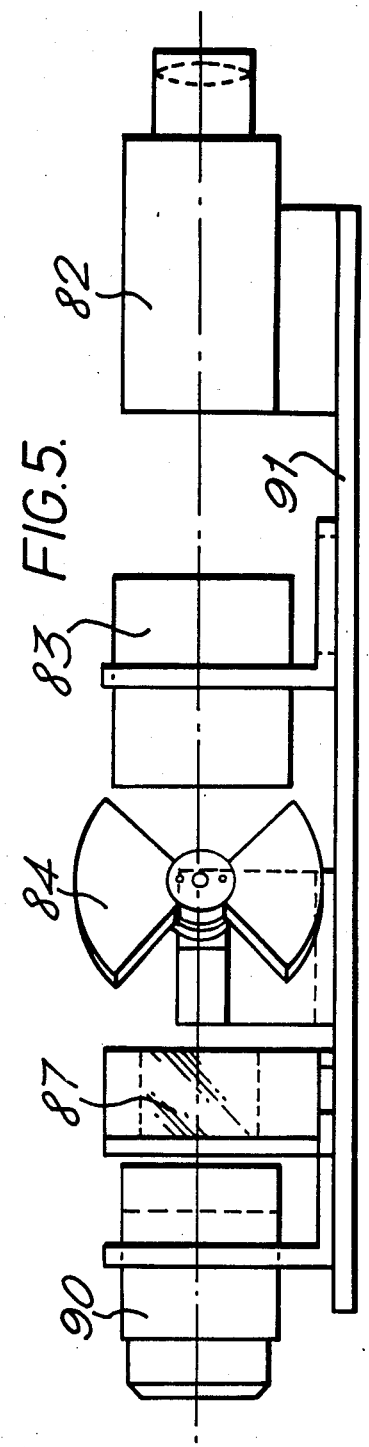

METHOD AND APPARATUS FOR THREE-DIMENSIONAL PHOTOGRAPHY

This is a continuation in part of Ser. No. 553,709 filed Nov. 21, 1983, now abandoned.

This invention relates to a method of three-dimensional photography and to apparatus for carrying out the method.

Existing system for producing three-dimensional (3D) photography and cinematography fall broadly into two categories: namely, dual camera systems and single camera systems. Dual camera systems utilise two interlocking cameras positioned with the axis of their respective lenses at 90° to each other. A two-way mirror of 50—50 transmission to reflection ratio is placed between the entrance pupils of the lenses to be positioned at the correct interocular distance for the particular focal length of the lenses and the film format in use. By varying the position of the two-way mirror the interocular distance can be varied; in addition by angling the mirror away from the basic 45° setting convergence between the lenses can be altered as required.

An even simpler way is to place two interlocked cameras side by side, angling them in towards each other physically to control convergence. However, due to the physical size of camera and lenses themselves, the interocular distance is somewhat greater than that of human eyes and therefore only lenses of longer focal lengths can be used to produce satisfactory results. The main advantage of the dual camera systems is that there are no limitations with regards to formats and aspect ratios.

Single camera systems use only one camera to photograph both left and right eye images. These images can be positioned side by side on 65 mm format or one above the other on 35 mm format. The latter is more common and means that both images are occupying the area of a normal 35 mm frame, ie alternate half frame sections, resulting in a limitation of the aspect ratio (Techniscope ratio). In all these cases both images are photographed simultaneously. The two images are produced by two prime lenses side by side and a group of optics and prisms therebetween which ensure that correct positioning of the images in both vertical and horizontal plane as well as having the correct orientation.

Single camera stereoscopic systems are known for example from U.S. Pat. Nos. 1,585,129 and 2,365,212 and U.K. Patent Specification Nos. 575911 and 749675. U.S. Pat. No. 1,585,129 discloses a stereoscopic motion picture camera in which images formed by rays of light from a centre lens alternate with those from lenses positioned to the right and left of centre. However, the provision of a centre lens means that the distance between the right and left lens elements must be greater than the natural interocular distance. Moreover, the lenses are positioned so as to provide parallel axes with a narrow angle of vision and no provision for convergence.

In U.S. Pat. No. 2,365,212 a camera is disclosed which has a rotatable shutter which has openings alternatively permitting the passage of light along two parallel paths forming the left and right eye images. The light conducted along either path is resolved downstream of the shutter by prisms so as to direct the light along the longitudinal centre line of the camera. The shutter mechanism is synchronised with the film actuator mechanisms whereby an unexposed frame of film will move into position for each of the light transmissions passed by the shutter so that the left and right eye images are recorded alternately on the film.

In U.S. Pat. No. 3,433,561 a stereo moving picture camera is disclosed in which two images are recorded simultaneously by recording two squeezed images die by side an 65 mm film so that alternate recording of images is excluded. In addition, although the interocular distance is substantially consistent with that of natural eyes the convergence of the respective right and left eye images is locked in to the focus by interconnection of one of the mirrors (33) with a focal length adjuster. Accordingly, the adjustment of the focal length simultaneously alters the position of the mirror (33) but not its associated anamorphic lens elements. Therefore, the redirected eye image passes throught the elements off-centre producing chromatic aberration.

U.K. Patent Specification No. 575911 discloses a stereoscopic cinematographic camera for recording left and right eye images alternately on film. However, the system is not able to achieve a natural interocular distance between left and right eye images whilst also using wide angle lens consistent with the field of vision of natural eyes.

In U.K. Patent Specification No. 749675 a camera is disclosed which has two parallel mirrors one of which is rotatable and arranged intermittently to cover the objective of the camera so that images transmitted by the two mirrors are recorded on to successive frames of film so as to form the left and right eye images of stereoscopic film. The two mirrors are positioned so that the images being recorded are images at right angles to the centre axis of the camera.

For the cinematograph film produced by either of the dual or single camera systems the viewing method depends on ensuring that the left eye sees only the left-eye image and the right eye only the right-eye image. Although U.S. Pat. No. 2,365,212 proposes shutter spectacles, this is most commonly achieved (for colour film) with the use of crossed polarising filters placed in the beam of the appropriate image. The viewer (i.e. the audience) sees the images through glasses with polarising filters whose polarisation axes are at 90° to one another corresponding to the polarisation axes on the projected images.

The projection is either by means of two interlocked projectors or by a single projector utilising a beam-splitting arrangement of mirrors whereby the two "over and under" images are separated out and superimposed on the projection screen.

Three-dimensional cinematography presents particular problems when it comes to special effects. Theoretically it is possible to project a stereoscopic background and to rephotograph it as a composite with suitable foreground action, using any of the existing systems. However, in practice, this is not so simple. In the case of the dual camera systems two cameras and two projectors would be required resulting in a very cumbersome piece of machinery. In the case of the existing single camera systems only on camera and one projector would be required utilising two identical lenses. Since both left and right eye images have to be projected on the same front-projection screen it is necessary to place crossed polarising filters in front of each lens—this cuts down the amount of projected light by about 1,5 f stops. Corresponding polarising filters have to be placed in front of the lenses on the camera unit so that the background images could be kept separated during rephotography; this cuts down the effective exposure by another 1,5 f stops, bringing the total up to 3 f stops. Moreover, in practice, polarising filters cause colour distortion which also needs to be corrected in order to produce a good match between the foreground and the background image. This can add up to at least another f stop—making the total loss of 4 f stops, which in turn makes it very impractical. Perhaps the biggest drawback to this method comes from the fact that the polarisation does not completely cancel the opposite image and this bleed through between the left and right eye images can result in a degradation of the image quality. It is also important that the operator can see what is taking place in front of him.

I have found that in order to achieve a perceivable three-dimensional impression it is essential:

(i) To use a wide angle lens element for each eye image in order to substantially match the natural horizontal field of vision. The natural field of vision which is in focus lies between 45° and 55° and, in addition, there are a few degrees of vision which are 'hazy' to each side of the perceived scene of vision. I therefore believe the lens elements should have an acceptance angle lying between 40° and 60° in order to achieve an acceptable match. For example a 25 mm focal length lens for a standard 35 mm Academy aperture (including sound track) has an acceptance angle of about 47.5°; a 25 mm lens with a full aperture system (excluding soundtrack) has an acceptance angle of about 52.9°. A 25 mm lens is therefore preferred for standard 35 mm film. If a special film is to be made on 70 mm film then a lens of 50 to 60 mm focal length giving the same order of acceptance angle is preferred.

(ii) To be able to adjust convergence. In order to achieve realistic three-dimensional effect the focus for a scene must be set to produce all the field of view as sharp whereas the convergence must be independently adjustable in order to direct attention to one particular area in the foreground or background. Moreover, three-dimensional effect is really only perceived close to e.g. mainly from 1 to 30 foot. Thus convergence is particularly important in order to emulate what the eyes of an observer would do if he were standing there at the time.

(iii) The interocular distance between the left and right images must be substantially consistent with natural eyes if the viewer is to accept the 3-D impression. Thus, the respective axes must generally be spaced apart between 60 and 65 mm.

Therefore, according to the present invention there is provided apparatus for providing left and right eye images along the lens axis of a camera whereby left and right eye images are recorded alternately on film strip so as to provide three-dimensional impression the apparatus comprising first means for receiving a first eye image along a first axis, second means for receiving a second eye image along a second axis spaced from the said first axis by a distance substantially consistent with the interocular distance of natural eyes, and means for resolving said first and second eye images alternately along the lens axis of the camera, the first and second receiving means each including respective first and second lens means providing a horizontal spread consistent with the horizontal angular spread of vision of natural eyes of between 40° and 60°, and means for adjusting the convergence of the first and second axes.

According to another aspect of the invention there is provided a viewfinder for a camera recording alternate left and right eye images on film strip by using resolving means for resolving spaced left and right images alternately along the lens axis of the camera, the viewfinder comprising lens means at which a scene being filmed is focussed, optical means defining an optical path for receiving the alternate left and right eye images passed along the lens axis of the camera, resolving means for separating out the images into left and right eye images, spaced left and right eyepieces for receiving the respective images, the eyepieces being set such the convergence of the left and right images is focussed substantially at said lens means, and the resolving means of the viewfinder being synchronised with the resolving means of the camera whereby the camera operator may see the three dimensional effect being recorded alternately on the film stip in the camera.

The invention will now be described by way of example with reference to he accompanying diagrammatic drawings in which:

FIG. 4 is a third embodiment of the invention as applied to a viewfinder; and

FIG. 5 is a side elevation of the viewfinder shown in FIG. 4.

Figures 1, 1A:
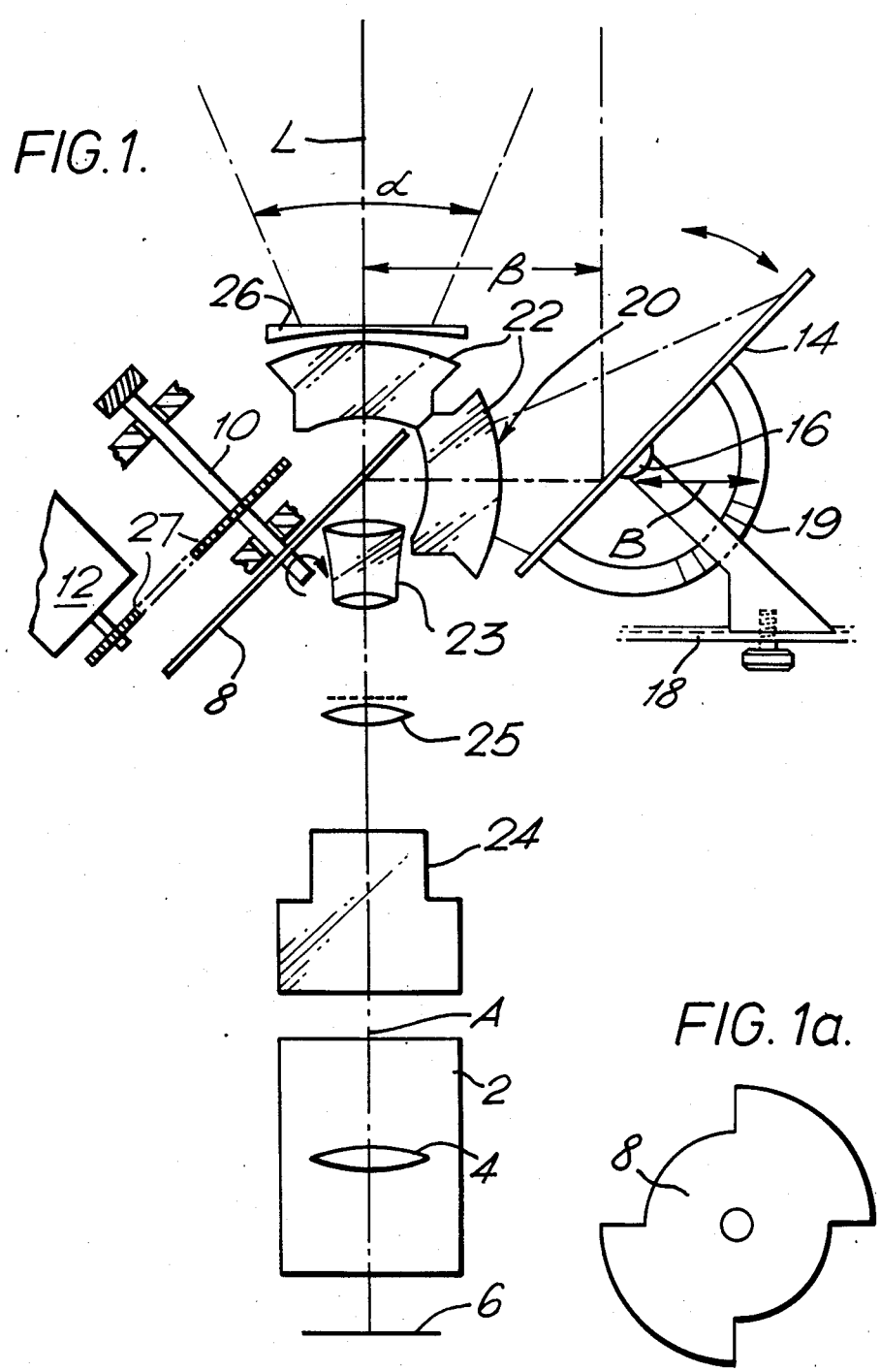
FIG. 1 shows the apparatus of the invention in a first embodiment as applied to a camera.
FIG. 1a is a front elevation of the shutter of the first embodiment.

In the embodiment of FIGS. 1 and 1a apparatus for converting an image into apparent three dimensions is applied to camera 2 where a single camera lens 4 is used for focussing the image to be recorded on film, the focal plane of which is indicated as 6. Left and right eye images are received along respective axes L and R which are spaced apart a distance 1 which is substantially consistent with the natural interocular distance of 60 to 65 mm. A segmented rotary shutter 8, shown in FIG. 1a, is placed at an angle to the lens axis A of the camera 2, e.g. 45° depending upon the desired convergence, in order to resolve the left and right eye images L and R alternately along the lens axis A. The shutter 8 is made of a front-silvered mirror with half the radius cut-away and is rotatable about an axis 10 by means of a drive motor 12. When the cut-away section of the shutter 8 is aligned with the lens axis A the left eye image L is photographed and, when the mirrored part of the shutter 8 is rotated in front of the lens axis A, the right eye image R is seen by the lens 4 via a second front-silvered mirror 14 placed with its surface generally parallel to the mirrored surface of the shutter 8 depending upon the angular inclination of the mirror 14 as will be explained. The mirror 14 is pivoted about an axis 16 and is mounted upon a slidable support 18. Thus the interocular distance between the left eye and right eye images L and R can be varied by moving the mirror 14 laterally nearer or further away from the lens axis A of the camera 1 in the direction of arrow B, and the convergence may be adjusted by varying the angle with the adjusted reading being indicated by convergence indicator 19.

The mirrored shutter 8 can be formed with a 180° cut-away portion or with two clear and two front silvered segment of 90° each as shown in FIG. 1a. The shutter 8 is driven by means of the motor 12 which is slaved to the camera motor (not shown) and is geared down appropriately. The camera 2 runs at 48 f.p.s. instead of the conventional 24 producing full frame left and right eye images in succession.

As explained above an important aspect of the invention is the wide angle of vision. In order to achieve this whilst maintaining the interocular distance $\beta$ at about 60 to 65 mm a primary lens assembly 20 including lenses of specific type of construction, such as the Cook Speed Panchro 25 mm f 1,8 (inverted-telephoto type), is used having front elements 22 and a rear element 23. These lenses, and lenses of this type of construction, have a fairly large gap between front and rear groups of elements and have a wide angle of acceptance in the range 47.5° to 52.9°. The rotary mirrored shutter 8 intersects the lens axis A inside the body of the lens assembly 20 and is arranged to deflect the received image R 90° along the camera lens axis A. The front elements 22 are cut off to acommodate two sets of front elements at 90° to one another and closely adjacent.

The front lens elements 22 are ground and readjusted and a new lens element 26 is added to the front-facing lens element 22 so that both left and right eye images L and R focus at the same distance from the lens unit and that they are of identical size.

This embodiment allows a correct arrangement between the focal length and interocular distance for a specific aspect rati.

A relay lens 4 is placed between the split primary lens unit 20 and the camera 2 with a field lens 25 disposed intermediate the rear element 23 of the primary lens unit 20 and the relay lens 24 (an image reversing prism can also be incorporated as part of the relay system). This relay lens makes it possible to vary the final image size to be photographed and therefore the format. The shutter 8 which is slaved to the camera motor (not shown) through gearing 27 is preferably geared down in the ratio 4:1.

Figure 2:
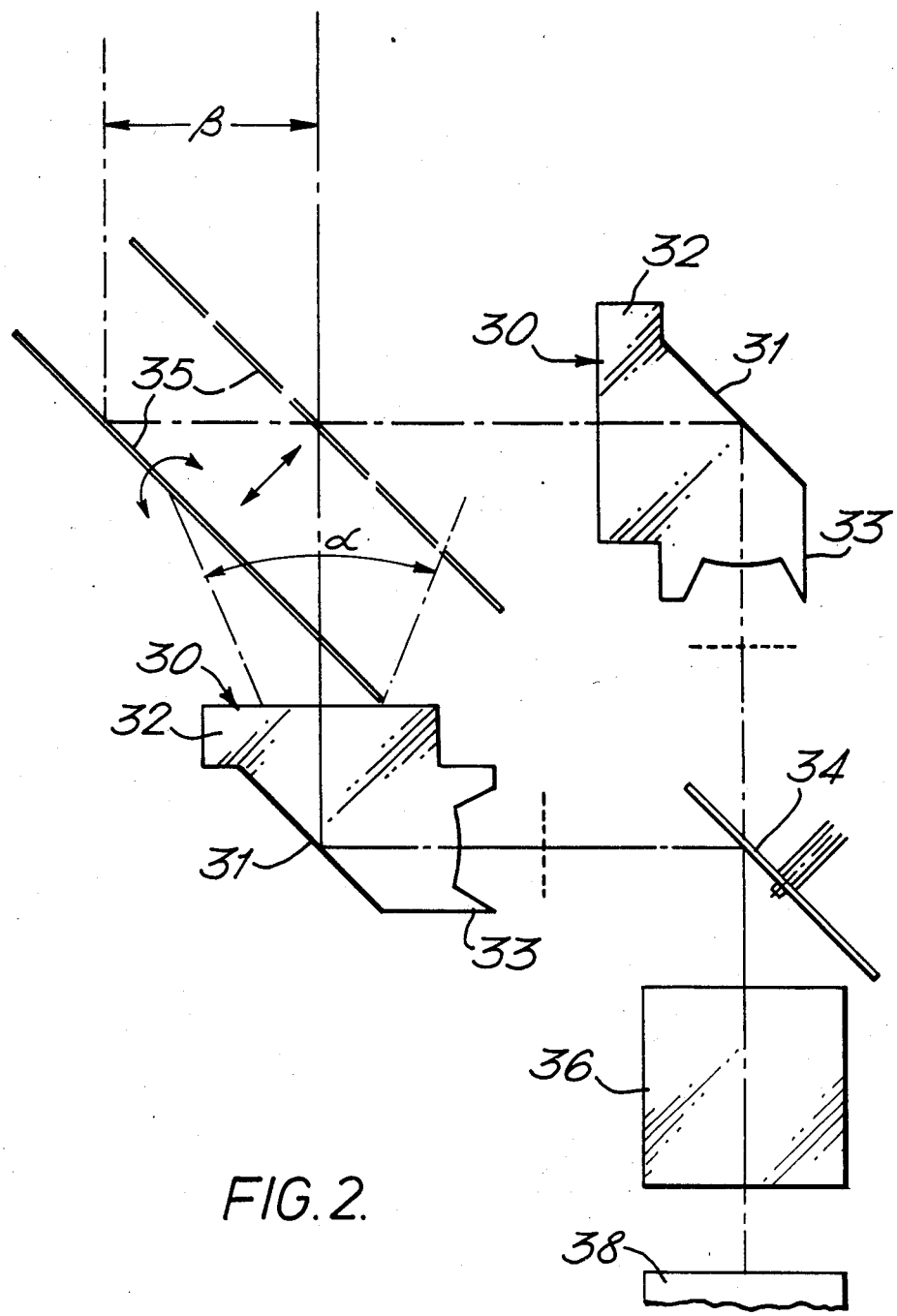
FIG. 2 shows a second embodiment.

The embodiment of FIG. 2 is designed to be used for both 25 mm and 18 mm lenses where the interocular distance needs to be varied from the normal (i.e. 2.5" for Academy with 25 mm) to zero. This particularly useful for shooting scale models and miniatures.

This embodiment incorporates two lenses of the inverted telephoto type of construction such as the Cook Speed Panchro 18 mm and 25 mm. The body of the lens 30 is cut at 45° to its axis in the gap at 31 between the front 32 and rear 33 groups of elements. A fixed silvered mirror is placed at the point of the cut 31 and the front group of elements 32 are re-assembled along the redirected lens axis, so that they lie at 90° to the rear group of elements 33. Two lenses 30 of identical construction are modified in this way and positioned with their exit and entrance axes running perpendicular to each other. A relay lens 36 is placed directly in line with the exit axis of one of the lenses 30 but at equal distance from the focal plane of both lenses. A segmented rotary shutter 34 placed at 45° and at the point where the exit axes of the two lenses 30 meet ensures that the images from the two lenses will be recorded on film by the camera 38, downstream of the relay lens 36, in succession. The lenses 30 are positioned so that their respective front elements 32 are at 90° to each other as shown and so that their axes intersect. By positioning a two-way mirror 35 with 50—50 transmission to reflection ratio at this point of intersection the two lenses produce identical images and the interocular distance is effectively zero. Then, by moving the two-way mirror 35 towards the lens which is "looking through it" (the lens to the left in FIG. 2), the deflected axis of the other lens (which is seeing a reflected image) is optically shifted to the opposite side to adjust the interocular distance $\beta$ as required. Thus, the lens which is seeing the scene reflected via the two-way mirror 35 and is positioned to the right of the lens which is looking directly at the scene through the two-way mirror 35 is in fact recording the left eye image. Convergence is controlled by varying the angle of the two-way mirror 35 for example as disclosed in FIG. 1.

The two-way mirror 35 can be replaced in certain circumstances by another segmented rotary mirror which would prevent the loss of 1 f stop.

The main advantage of the 3D systems in accordance with the invention is that, in all cases, there are no limitations to the aspect ratio or film format. All 35 mm aspect ratios can be photographed including 2:1 Anamorphic squeeze (anamorphic attachment is added to the relay system). For flat release prints a C.R.I. is stepprinted from the original negative (printing every other frame) and the release prints can then be made from this in the conventional manner. This does not introduce another printing stage because it is a standard practice to make several duplicates of the original negative and make release copies from them. In the production of a C.R.I. dupe an optical printer is used in any case (to preserve the correct geometry of the image)—and skip-framing is an automatic operation on most printers.

All the conventional aspect ratios used on 35 mm can be photographed with the standard 35 mm camera. However if Techniscope format is to be used then the camera mechanism needs to be changed to pull down 2 perforations instead of four, with the appropriate mask in the camera. In this way two frames occupy the area of one conventional frame, and, although they are taken intermittently they can be projected simultaneously using conventional theatrical 3D projection methods. Flat copies from this method are made on 4 perforations with a 2:1 anamorphic squeeze. If a vertical anamorphic squeeze (instead of the conventional horizontal one) is introduced in the relay system during photography it is then possible to project an Academy aspect ratio using an anamorphic lens on the projector rotated through 90° from the conventional position. A suitable amended beam splitter attachment placed in front during projection would enable stereo viewing in the Academy aspect ratio. Flat release copies can also be made by desqueezing the vertical during the printing of the C.R.I. at the same time as the skip-framing is done.

By suitable adjustments to the relay system it is possible to shoot on larger formats such as Vista/Vision and 65 mm. This is particularly desirable for front-projection and other special effects work where duplication is necessary. Naturally a Vista/Vision or 65 mm camera has to be used. For front-projection a plate produced in this way would then be rephotographed as a composite with the foreground on one of the conventional 35 mm aspect ratios.

As can be seen the Techniscope format can be used directly for theatrical presentation as though it had been shot by the conventional single lens 3D systems described earlier in the specification.

Other 35 mm aspect ratios can either be cropped and reprinted on the Techniscope format or the left and right images can be separated out on two rolls of film and projected by means of two interlocked projectors, as would be the case if they had been produced by a two-camera system. Either of the copies can be used for flat releasing.

It is also possible to project all the various aspect ratios directly as they were photographed. For this it is necessary for the projector to run at double speed (48 f.p.s.) i.e. at the same speed as the camera during the original photography. In order to achieve the separation between the left and right eye images an appropriate attachment is placed in front of the projector lens as disclosed in our copending U.K. application No. 8501476 to which reference is directed for further details.

Another major problem with the existing 3D systems is that the camera operator cannot see a true 3D effect through the viewfinder. This leads to the inaccurate setting of the interocular distance and most particularly convergence which, as I have indicated, are particularly important. The way the 3D effect is going to look when it is projected can only be guessed. In the case of front-projection this makes it difficult to see how the projected 3D images and the foreground interact making the matching of these elements impossible.

Figure 3:
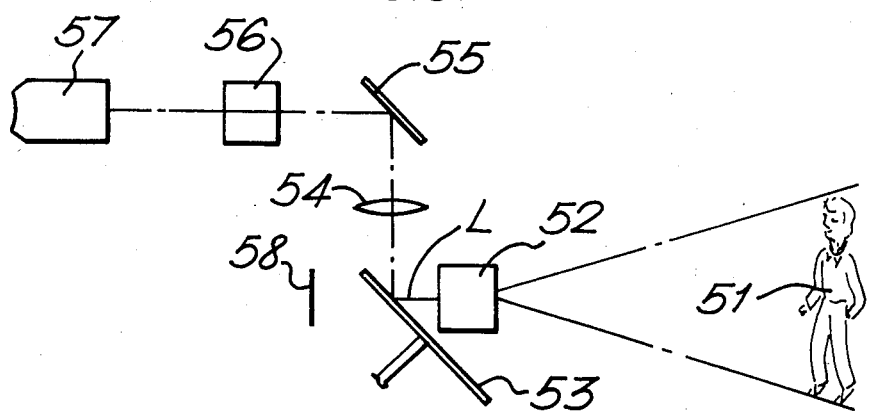
FIG. 3 shows the conventional arrangement for viewing a subject being filmed.

The conventional viewfinder for a camera is shown in FIG. 3. The subject 51 is seen through the camera lens 52 via the camera shutter (reflex) 53, field lens 54, mirror 55, relay lens 56 and the eyepiece 57. This provides a view along the lens axis L of the same image as received at the film plane indicated at 58. The field lens 54 is positioned immediately behind the ground glass (not shown) and picks up the aerial image of the ground glass.

According to another aspect of the invention I propose in FIGS. 4 and 5 a viewfinder which replaces the eyepiece 57 of a conventional viewfinder. In this embodiment light from the ground glass is passed to a field lens 81 supported on a mounting block 82 which bolts onto the camera by bolts (not shown). The image is then received by a relay lens 83 which transmits the light to a fully reflective mirror shutter 84 of the bow-tie type shown in FIG. 1a. The shutter 84 is driven by motor 85 in synchronism with the motor of the camera to which the viewfinder is secured. The shutter 84 thus either allows light to pass straight to the left eyepiece 86 via fully reflective mirrors 87 and 88 or reflects the light to fully reflective mirror 89 which in turn reflects the light to the right eyepiece 90.

As seen in FIG. 4 the shutter 84 is positioned at 45° to the entrance axis by the fully reflective mirrors 88 and 89 which are set at 43° to provide a 4° convergence for each eyepiece which is more compatible with the natural focussing of the eyes. The various components are mounted on an appropriate base plate 91.

The respective optical paths for the left and right eyepieces are arranged to be the same length so that adjustment by further relay lenses of differing focal lengths are not required. In FIG. 5 the fully reflective mirror 89 is omitted for clarity.

As well as being a very useful system for conventional 3D cinematography, the present invention is also perfect for front-projection and back-projection (even if the backgrounds are originated by one of the existing 3D systems, they can be prepared and used for front-projection in this way).

By tracking the entire camer/projector assembly towards or away from the front-projection screen with the appropriate "follow focus" attachments on both lenses and an iris compensator on the projector lens, it is possible to create movement "in depth", an arrangement disclosed in detail in may prior U.K. Pat. No. 1563188 to which reference is directed; this arrangement can produce some quite remarkable effects in 3D.

I claim:

1. Apparatus for providing left and right eye images along the lens axis of a camera whereby left and right eye images are recorded alternately on film strip so as to provide a three dimensional impression, the apparatus comprising first means for receiving a first eye image along a first axis, second means for receiving a second eye image along a second axis spaced from the first axis by a distance substantially consistent with the interocular distance of natural eyes, means for resolving said first and second eye images alternately along the lens axis of the camera, the first and second receiving means each including respective first and second wide angle lens means providing a horizontal angular spread consistent with the horizontal angular spread of vision of natural eyes of between 40° and 60°, and means for adjusting the convergence of the first and second axes, the first eye axis and second eye axis being spaced from the lens axis, the first and second lens means being arranged to deflect their respective first and second eye images through 90°, and the resolving means comprising two reflective means, one reflective means aligned with the first eye axis whereby, via the first lens means, the first eye axis is deflected coincident with an optical path to the lens axis and intersects the second eye axis, and the other reflective means being positioned intermittently transverse to the optical path to the lens axis in synchronism with a drive motor of the camera at said intersection, whereby during the reflecting duration of the other reflective means the second eye image passes along the lens axis and, during the non-reflective duration thereof, the first eye image passes along the lens axis whereby left and right eye images may be recorded alternately on film strip.

2. Apparatus according to claim 1 wherein the one reflective means is a two-way mirror with 50—50 transmission, the first eye image being reflected by the one reflective means and the second eye image passing through the one reflective means.

3. Apparatus according to claim 1 wherein the spacing between the first and second eye axis is adjusted by lateral movement of the one reflective means.

4. Apparatus according to claim 1 wherein the other reflective means is a front silvered, fully reflecting circular mirrored shutter with two 90° opposed portions cut-away.

5. Apparatus for providing left and right eye images along the lens axis of a camera whereby left and right eye images are recorded alternately on film strip so as to provide a three dimensional impression, the apparatus comprising first means for receiving a first eye image along a first axis, second means for receiving a second eye image along a second axis spaced from the first axis by a distance substantially consistent with the interocular distance of natural eyes, means for resolving said first and second eye images alternately along the lens axis of the camera, the first and second receiving means each including respective first and second wide angle lens means providing a horizontal angular spread consistent with the horizontal angular spread of vision of natural eyes of between 40° and 60°, and means for adjusting the convergence of the first and second axes, the first eye axis being aligned with the optical path to the lens axis and the resolving means comprising two reflective means, one reflective means aligned with said second eye axis and arranged to direct the second eye image transverse to the said lens axis and the first eye axis to intersect said axes, and the other reflective means being positioned at said intersection to receive the second eye image and to reflect it along said lens axis of the camera, said other reflective means being arranged alternately to reflect the second eye image along the lens axis whilst the first eye image passes along the lens axis whereby left and right eye images may be recorded alternately on film strip, the first and second lens means being positioned side by side at right angles to one another, the other reflective means being a rotary circular mirrored shutter with two 90° opposed portions cutaway which is positioned inside the angle defined by the first and second lens means and a real lens element of the lens assembly.

6. Apparatus according to claim 5 wherein the means for adjusting the convergence of the first and second eye axis comprises means for altering the angle of inclination of the one reflective means.

7. Apparatus for providing left and right eye images along the lens axis of a camera whereby left and right eye images are recorded alternately on film strip so as to provide three-dimensional impression, the apparatus comprising first means for receiving a first eye image along the first axis, second means for receiving a second eye image along a second axis spaced from the said first axis by a distance substantially consistent with the interocular distance of natural eyes, the first and second receiving means each including respective first and second wide angle lens means providing a horizontal angular spread consistent with the horizontal angular spread of vision of natural eyes of between 40° and 60°, means for resolving said first and second eye images alternately along the lens axis of the camera, said resolving means comprising two reflective means, a first reflective means aligned with one of the first eye axis of the second eye axis whereby, via the respective lens means, the said one eye axis is deflected so as to intersect the other eye axis, one of the said eye axes before or after deflection being coincident with an optical path to the lens axis and a second reflective means being positioned intermittently transverse to the optical path to the lens axis in synchronism with a drive motor of the camera at said intersection, whereby during the reflecting duration of the second reflective means the eye image not aligned coincident with the lens axis is reflected so as to pass along the lens axis and, during the non-reflecting duration thereof, the eye image which is or has been aligned with the lens axis passes along the lens axis whereby left and right eye images may be recorded alternately on film strip, and means for adjusting the convergence of the first and second axes.

8. A viewfinder for a camera recording alternate left and right eye images on film strip by using resolving means for resolving spaced left and right eye images alternately along the lens axis of the camera, the viewfinder comprising lens means at which a scene being filmed is focussed, optical means defining an optical path for alternate left and right eye images passed along the lens axis of the camera, resolving means comprising a first reflective means positionable intermittently transverse to the optical path for separating out the images into left and right eye images, spaced left and right eyepieces for receiving the respective images, one eye image path between the resolving means and the respective eyepiece including first and second fully reflective surfaces, the other eye image path between the resolving means the respective eyepiece including a third fully reflective surface, the first and the second fully reflective surfaces and the third fully reflective surface being positioned transverse to the respective said one eye image path and the said other eye image path such that the left and right eye images have a convergence consistent with the natural focussing of the eyes and the eyepieces being set such that the convergence of the left and right eye images is focussed substantially at said lens means, and the resolving means of the viewfinder being synchronised with the resolving means of the camera whereby the camera operator may see the three dimensional effect being recording alternately on the film strip in the camera.

* * * * *